United States Patent [19]

Penhallurick et al.

[11] 3,885,463

[45] May 27, 1975

[54] APPARATUS FOR SLICING AND SPREADING BREAD

[75] Inventors: Mervyn Major Penhallurick; Colin McGrath, both of Surfers Paradise, Queensland, Australia

[73] Assignee: Penmac Distributors, Brisbane, Queensland, Australia

[22] Filed: Mar. 22, 1974

[21] Appl. No.: 453,782

[52] U.S. Cl................................. 99/450.2; 83/4
[51] Int. Cl............................... B26d 3/28
[58] Field of Search............ 99/450.1, 450.2, 450.3, 99/450.4, 450.5, 450.6; 83/4

[56] References Cited
UNITED STATES PATENTS

| | | | |
|---|---|---|---|
| 1,029,357 | 6/1912 | Gage | 99/450.2 |
| 1,816,536 | 7/1931 | Joachimson | 99/450.2 |
| 3,119,352 | 1/1964 | Fay | 99/450.4 |
| 3,736,820 | 6/1973 | Jung | 83/4 |

Primary Examiner—Robert W. Jenkins
Attorney, Agent, or Firm—Donald D. Jeffery

[57] ABSTRACT

Bread slicing and spreading apparatus includes a loaf holder, reciprocally movable on a frame, which receives a loaf vertically and is contracted to hold it or expanded to release it. The advancing loaf holder moves the loaf past two vertically spaced cutters which sever from its lower part two slices which are held by movable supports, moves the slices above and below a perforated tubular spreader from which spread is applied to the near surfaces of the slices, and moves the uncut loaf onto a fixed support while the loaf holder expands and the movable supports are moved to drop the two superimposed spread slices. On the return stroke of the loaf holder, the loaf drops to the returned movable supports and the process is repeated.

5 Claims, 5 Drawing Figures

APPARATUS FOR SLICING AND SPREADING BREAD

BACKGROUND OF THE INVENTION

Establishments such as sandwich shops require to be provided with large supplies of sliced and buttered bread, and the generally convenient way for this to be available is in pairs of slices with the buttered sides towards each other, so that each pair of slices may be easily separated for the insertion of a filling between them. The general object of the present invention is to provide apparatus which will quickly and efficiently cut a loaf into pairs of slices, applying butter or any other suitable desired spread to the near surfaces of the two slices, the slices being delivered, in pairs of spread slices, to any convenient receptacle, the apparatus being capable of being manufactured simply and economically, being of conveniently compact form, and being easy and convenient to operate.

SUMMARY OF THE INVENTION

A bread slicing and spreading apparatus according to the present invention includes a holder for a loaf to be sliced, the holder being mounted in reciprocally movable manner on a main frame, means being provided for reciprocating the loaf holder. A pair of cutters are mounted on the main frame being spaced apart and so arranged that with each forward movement of the loaf holder, the cutters sever two slices therefrom, and carry the two slices, supported by movable supports, past opposite sides of a perforated tubular spreader from which spread is expressed onto the two facing surfaces of the slices, after which the movable supports are moved to discharge the spread pair of slices. On the return movement of the loaf holder, the loaf is advanced therein so that the process can be repeated. Preferably the loaf holder receives a loaf disposed vertically, and is contracted to hold the loaf and expanded to permit the loaf to advance gravitationally in the holder. The spread is fed into and expressed from the perforated spreader only during the slicing operation, and preferably the feed of the spread may be interrupted for the docking of a first slice of crust from a loaf, means being provided for supporting the loaf in the holder in such position that during this operation, a single slice only will be cut from the loaf during the forward movement of the load holder.

BRIEF DESCRIPTION OF THE DRAWINGS

A preferred embodiment of the invention is shown in the accompanying drawings, wherein.

DESCRIPTION OF ONE PREFERRED EMBODIMENT OF THE INVENTION

Figure 1:
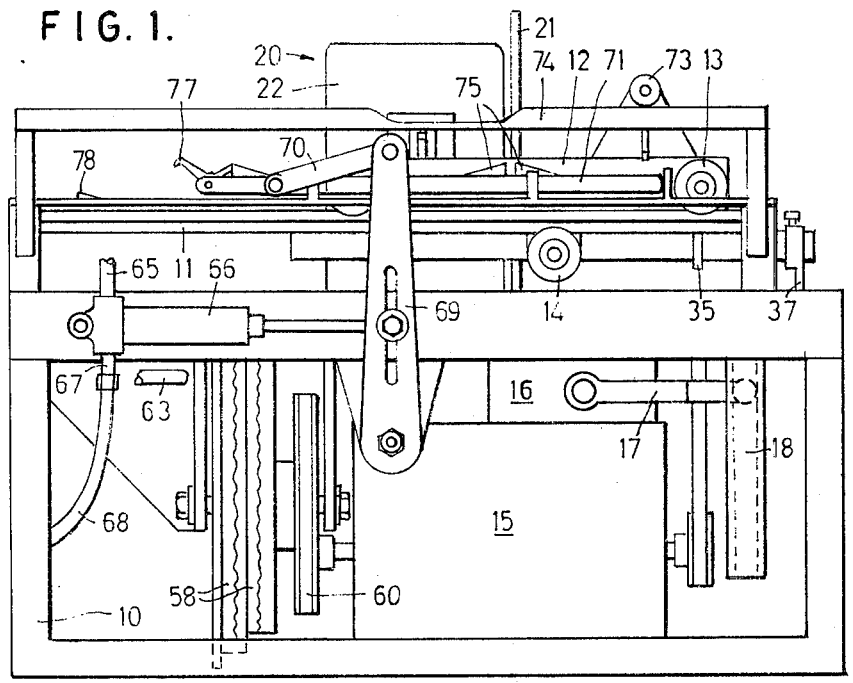
FIG. 1 is a side elevation of a bread slicing and spreading machine according to the invention.
Figure 2:
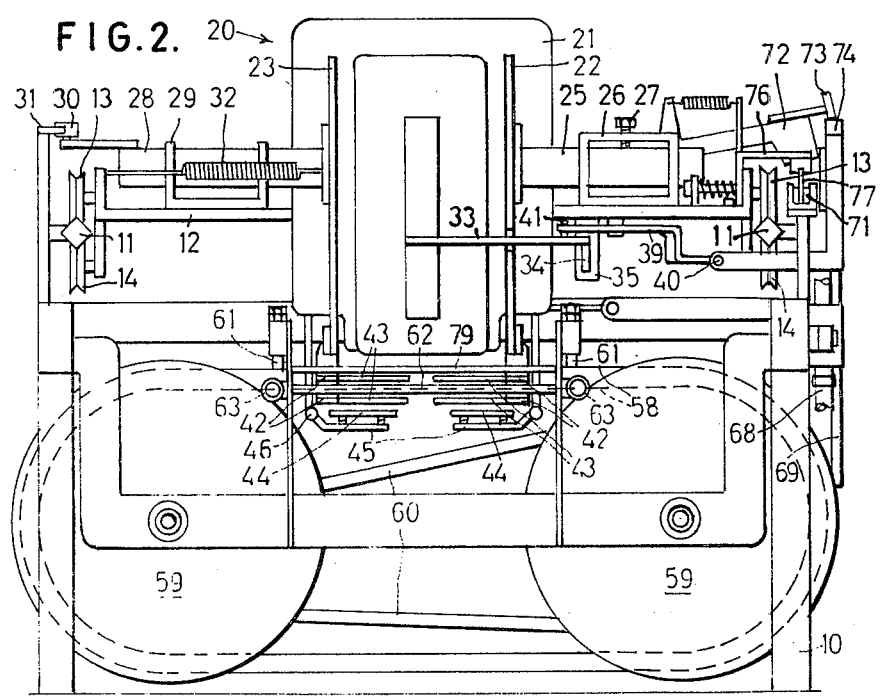
FIG. 2 is a front elevation of the machine.
Figure 3:
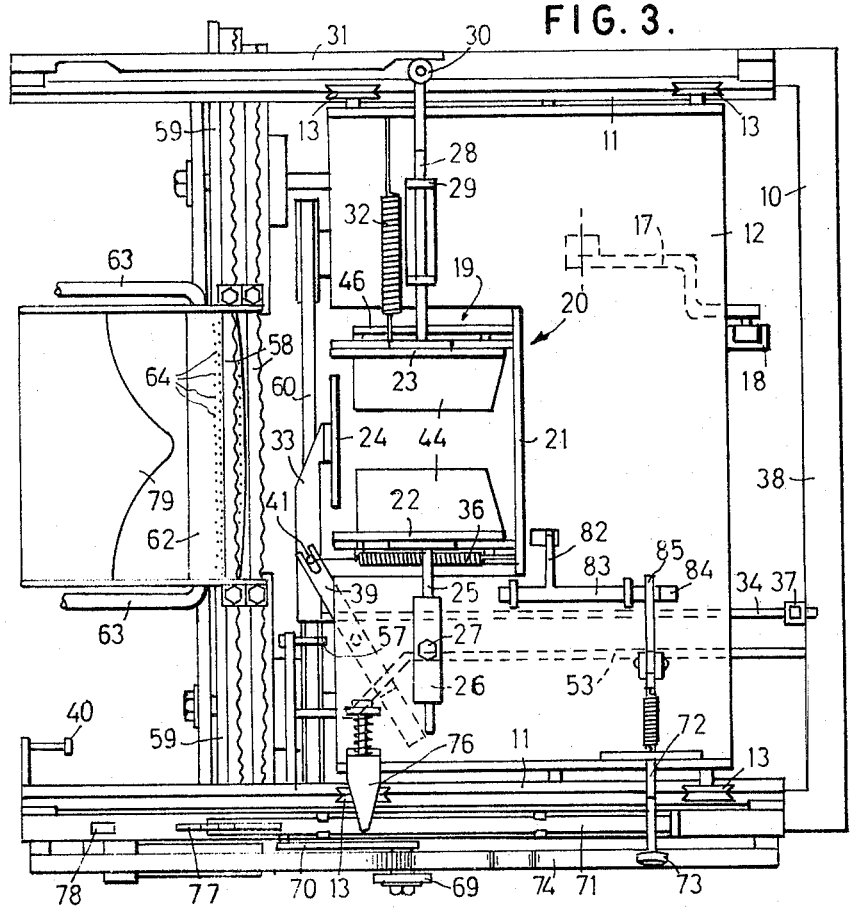
FIG. 3 is a plan view of the machine.

The machine includes a base frame 10 on which a pair of parallel longitudinal horizontal rails 11 are mounted. A carriage 12 with wheels 13 riding on the rails 11 and further wheels 14 engaged under the rails is reciprocally movable by a motor 15 driving, through a gear box 16, a crank 17 engaged in a vertical channel 18 at the rear of the carriage.

The carriage consists mainly of a horizontal plate, and through an opening 19 in the carriage there extends a loaf holder 20, including a vertical transverse back plate 21, a pair of vertical side plates 22 and 23, perpendicular to the back plate and a front plate 24 parallel to the back plate. All four plates are preferably of transparent material. The back plate 21 is fixed, the side plate 22 is laterally adjustable, being carried by a horizontal arm 25 slidable through a guide 26 and retained by a set screw 27. The other side plate 23 is laterally movable, being carried by a horizontal arm 28 slidable through a guide 29 and carrying a cam follower 30 which co-acts with a longitudinal cam track 31 on the base frame 10. A spring 32 urges the side plate 23 away from the side plate 22, and the cam track 31 is such that at each end of the reciprocating stroke of the carriage, the side plate 23 moves outwardly, or in the direction away from side plate 22, but during the remainder of the travel of the carriage, the side plate is held in inward position, closer to side plate 22.

The front plate 24 is movable forwardly and rearwardly in parallelism, relative to the carriage, being carried by a lateral arm 33 extending from a longitudinal bar 34 longitudinally slidable in guides 35 under the carriage 12, a spring 36 urging the front plate to its rear position relative to the carriage. A stop 37 on the rear end of the bar 34 is brought against a transverse rear member 38 of the base frame 10 as the carriage nears its rearmost position so that with further retraction of the carriage the front plate 24 cannot move rearwards, and so relative to the carriage, it is moved to its forward position. As the carriage commences to advance, the front plate, relative to the carriage, moves to rear position. As the carriage 12 nears its foremost position one end of a lever 39 fulcrumed on the carriage is brought to a stop 40 on the base frame 12, the bifurcated other end of this lever engaging a pin 41 of the arm 33 causing the front plate to be moved to its forward position.

The loaf holder includes a pair of parallel longitudinal bars 42 associated with each of the side plates 22 and 23. These bars at their rear ends are rigidly secured to each other and to the side plate in spaced arrangement and to each of the bars 42 there is secured to a laterally extending bar 43, the bars 43 being in spaced parallel arrangement below the back plate 21.

A loaf (not shown) to be sliced and buttered may be inserted in the loaf holder 20 when the carriage 12 is in rearmost position, the side plate 23, with its associated spaced bars 42 being moved laterally outwards and the front plate 24 being in forward position. The loaf when so inserted is supported by a pair of loaf support flaps 44 mounted in sprung manner above a pair of flap carriers 45 extending from the front pairs of a pair of longitudinal rods 16, the rear parts of which are mounted rotatably under the carriage 12. Levers 47 extending in opposite directions from the rods 46 are interconnected by a connecting rod 48 which is connected by a link 49 to a laterally movable slide bar 50 carrying a cam follower 51 against a cam track 53 on the base frame 10. When the carriage is in foremost position, the loaf support flaps 44 extend downwardly. As the carriage moves rearwardly the cam follower 51 so moves along the cam track 53 as to bring the loaf supports flaps to fully raised position. When the carrier nears the rearmost position, a pawl 54 under the carriage strikes a stop 55 on the cam track 53 and is moved into engagement with a pin 56 on the slide bar 50. When the carriage is advanced, the cam follower 51 cannot follow the cam track 53 to lower the flaps 44 until the pawl 54 is brought to a stop 57 on the base frame, and thus moved clear of the pin 56 so that the spring 52 causes the slide bar 50 to move rapidly, lowering the loaf support flaps 44 with a rapid movement.

With each advance of the carriage 12, two slices are cut from the loaf carried by the loaf holder by a pair of band saws 58 carried by a pair of double drums 59 with two different diameters mounted on the base frame 10, their axes arranged longitudinally and parallel and in a common horizontal plane. The motor 15 drives one drum by a belt and pulley drive 60. As the carriage advances, the loaf is pushed past the upper run of the two band saws 58 which are at different levels, that of the upper saw being variable by adjustable pressure pads 61, so that slices may be cut to desired thickness. With each advance of the carriage 12, and the loaf holder 20 mounted thereon, the bottom edges of the side plates 22 and 23 and of the back plate 21, pass closely above the upper saw, the upper bars 42 and 43 pass between the two saws, and the lower bars 42 and 43 pass under the lower saw.

Directly in front of the upper run of the lower saw 58 there is mounted a spreader 62 consisting of a thin hollow blade with a curved edge presented to the approaching loaf. Butter is fed into the spreader from both sides through a feed pipe 63, and issues from the spreader through a large number of small holes 64 through its upper and lower surfaces. Butter is drawn from a reservoir (not shown) into the inlet 65 of a plunger pump 66, and is ejected under pressure from the outlet 67 of the pump through a flexible hose 68 to the feed pipe 62. The body of the pump is pivoted on the base frame 10, its plunger being pivoted adjustably to a slotted lever 69, one end of which is fulcrumed on the base frame 10, its other end being connected by a link 70 to a slide bar 71 mounted in longitudinally slidable manner on the base frame. A slide bar actuating lever 72 fulcrumed on the carriage 12 is provided with a cam follower 73 which, as the carriage advances and retracts, travels on a cam track 74 on the base frame. The cam track 74 is such that, when the carriage 12 has advanced for some distance, the lever 72 drops into engagement between a pair of detents 75 on the slide bar 71, so that the slide bar is advanced with the carriage for some distance before the lever 71 is again raised clear of the detents 74. During such movement of the slide bar 71, the slotted lever 69 is so moved as to cause butter to be pumped from the pump 66 to the spreader. As the lever 72 is lifted clear of the detents 75, a spring-loaded lever 76 on the carriage co-acts with a catch 77 on the slide bar 71 causing it to swing into engagement with a stop 78 on the main frame. As the carriage 12 advances further, no further butter is pumped; but the slide bar 71 is prevented by the catch 77 from being retracted by back pressure from the pump. When the carriage is retracted for some distance, the spring loaded lever 76 again co-acts with the catch 77, moving the catch clear of the stop 78, and at the same time the slide bar actuating lever 72 drops into engagement between the detents 75 and causes the slide bar 71 to be moved rearwardly with the carriage, so that the plunger of the pump 66 is retracted, drawing further quantity of butter into the pump.

As two cuts are made through the loaf by the saws 58, the adjacent surfaces of the two slides are passed over the top and bottom faces of the spreader 62, and butter ejected from the holes 64 thereof is spread upon these surfaces.

Directly behind the upper run of the upper band saw 58 there is mounted on the base frame 10 a fixed loaf support blade 79, and the advancing carriage brings the unsliced part of the loaf over this blade, as the movable side plate 23 of the loaf carrier 20 is moved outwardly and the front plate 24 is moved forwardly relative to the carriage. The two buttered slices remain supported by the support flaps 44 until these flaps are rapidly swung down, as before described, so that the two slices, the adjacent faces spread with butter, will fall from the loaf carrier into a suitable receptacle (not shown).

Figures 4, 5:
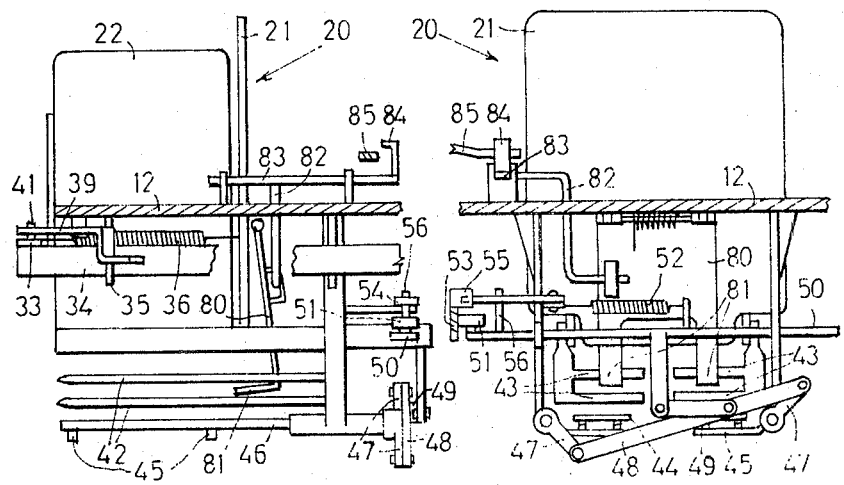
FIG. 4 is a side elevation of the loaf holder and associated parts.
FIG. 5 is a rear elevation of the loaf holder and associated parts.

It may be preferred that the machine include means for docking a loaf by cutting off a first slice of crust at an end of the loaf, which may be discarded, without any wastage of butter. In this case, as shown in FIGS. 4 and 5 there is provided behind the back plate 21 of the load carrier 20 a flap 80 with a pair of forwardly peojecting support lugs 81, and spring loaded to cause these lugs normally to project forwardly between the upper and lower bars 43 below the back plate. The flap 80 is operatively connected, by an arm 82 to a slide bar 83 longitudinally slidable on the carriage 12 and provided with a detent 84 which, when the flap is in advanced position, its lugs 81 projecting forwardly below the back plate 21, engages an arm 85 extending from the slide bar actuating lever 72 and prevents this lever from being lowered into engagement with the detents 74 of the slide bar 71. When a fresh loaf is placed in the loaf carrier 20, the support lugs 81 hold it at such height that, on the first advance of the carriage, only a single slice is cut from the loaf and, since the slide bar 71 is not moved, no butter is spread. After the cutting of this first slice, the slide bar 83 is held in retracted position by any suitable catch or other means (not shown), so that the support lugs 81 are retracted, and the slide bar actuating lever 72 is free to operate in normal manner. The first slice then, having been cut from the loaf and discarded, the remainder of the loaf will be divided into pairs of buttered slices of bread.

The slices discharged from the machine may be received in any suitable receptacle (not shown) or into a bag which will receive the whole sliced and buttered loaf, and may be sealed for delivery.

Apparatus according to the invention will be found to be very effective in achieving the objects for which it has been devised. Minor modifications of constructional detail and design, which will be readily apparent to skilled persons, may be made within the scope of the invention hereinafter claimed.

We claim:

1. Apparatus for slicing and spreading bread including:
    a frame,
    a carriage mounted for reciprocal horizontal movement on the frame,
    means for reciprocating the carriage,
    a loaf holder on the carriage to receive a loaf of bread with one end lowermost,
    movable support means for releasably supporting a loaf in the loaf holder, a pair of vertically spaced substantially horizontal cutters so located that as the carriage and loaf holder are advanced the cutters cut through the lower part of the loaf supported in the loaf holder to sever two slices from the loaf, a hollow substantially horizontal fixed spreader blade mounted on the frame near to the trailing part of the lower cutter and having an inlet thereto, and outlets from its upper and lower faces, and means for feeding a spread under pressure to the inlet to the speader for ejection from the spreader outlets onto adjacent surfaces of the two slices severed from the loaf.

2. Apparatus according to claim 1 wherein the cutters comprise:

the upper runs to two endless cutter blades on two pairs of coaxial drums of different diameters mounted on the frame, means for driving one of the pairs of drums, and means for adjustably varying the vertical spacing between the two cutters.

3. Apparatus according to claim 1 wherein the loaf holder includes:

a plurality of upright members between which a loaf is vertically movable, and means for automatically constricting said upright members onto a loaf as the carriage approaches fully retracted and fully advanced positions, and for automatically separating said upright members between said fully retracted and fully advanced positions.

4. Apparatus according to claim 1 including:

a fixed loaf support mounted in advance of the upper cutter and adapted, as the loaf holder approaches fully advanced position to support the loaf above the slices severed therefrom, and means for automatically moving the movable support means, as the carriage approaches fully advanced position, to permit the two slices severed from the loaf to fall from the loaf holder.

5. Apparatus according to claim 1 including:

secondary movable support means are provided on the loaf holder, adapted, when in operative position, to support a loaf within the loaf holder in such manner that on the advance of the carriage the loaf clears the lower cutter and has a single slice only severed by the upper cutter, and actuating means for bringing the secondary movable support means to operative position and for simultaneously interrupting the means for feeding the spread under pressure to the inlet to the spreader.

* * * * *